United States Patent
Modzik et al.

(10) Patent No.: US 9,861,021 B2
(45) Date of Patent: Jan. 9, 2018

(54) DUAL FUNCTION VIBRATION ISOLATION AND HANDLE SWIVEL

(71) Applicant: HUSQVARNA AB, Huskvarna (SE)

(72) Inventors: Andrew Modzik, Charlotte, NC (US); Matt Lambert, Harrisburg, NC (US)

(73) Assignee: HUSQVARNA AB, Huskvarna (SE)

( * ) Notice: Subject to any disclaimer, the term of this patent is extended or adjusted under 35 U.S.C. 154(b) by 168 days.

(21) Appl. No.: 14/773,868

(22) PCT Filed: Mar. 14, 2013

(86) PCT No.: PCT/US2013/031581
§ 371 (c)(1),
(2) Date: Sep. 9, 2015

(87) PCT Pub. No.: WO2014/142906
PCT Pub. Date: Sep. 18, 2014

(65) Prior Publication Data
US 2016/0021812 A1    Jan. 28, 2016

(51) Int. Cl.
*B25G 1/01*    (2006.01)
*A01B 33/08*    (2006.01)
(Continued)

(52) U.S. Cl.
CPC .......... *A01B 33/08* (2013.01); *A01B 33/028* (2013.01); *B25F 5/006* (2013.01); *B25G 1/01* (2013.01);
(Continued)

(58) Field of Classification Search
CPC .................. A01B 33/028; B25G 1/01
(Continued)

(56) References Cited

U.S. PATENT DOCUMENTS 2,728,283 A    12/1955   Oswalt
4,392,538 A     7/1983   Goertzen
(Continued)

FOREIGN PATENT DOCUMENTS

CN    202183936 U    4/2012
CN    202679916 U    1/2013
(Continued)

OTHER PUBLICATIONS

International Search Report and Written Opinion in the International Application No. PCT/US2013/031581 dated Jun. 10, 2013.
(Continued)

*Primary Examiner* — Gary S Hartmann
(74) *Attorney, Agent, or Firm* — McNair Law Firm, P.A.

(57) ABSTRACT

A walk behind power equipment device includes a frame (or housing), an engine supported at least in part by the frame or housing, a mobility assembly operably coupled to the frame and to the engine to provide mobility of the walk behind power equipment device responsive to operation of the engine, a working assembly and a handle assembly. The working assembly is operably coupled to the frame and to the engine to facilitate performance of a working function of the walk behind power equipment device responsive to operation of the engine. The handle assembly is operably coupled to the frame via a handle coupler to provide steering inputs responsive to which the mobility assembly moves the walk behind power equipment device via a handle apparatus of the handle assembly. The handle coupler is configured to provide at least vibration isolation and handle apparatus orientation adjustment.

8 Claims, 4 Drawing Sheets

(51) Int. Cl.
*A01B 33/02* (2006.01)
*B62D 51/06* (2006.01)
*B25F 5/00* (2006.01)
*E02D 3/046* (2006.01)
*B62D 51/04* (2006.01)
*A01B 45/02* (2006.01)

(52) U.S. Cl.
CPC ............. *B62D 51/06* (2013.01); *E02D 3/046* (2013.01); *A01B 45/023* (2013.01); *B62D 51/04* (2013.01)

(58) Field of Classification Search
USPC .................. 56/DIG. 18; 15/DIG. 10; 37/196
See application file for complete search history.

(56) References Cited

U.S. PATENT DOCUMENTS

| | | | |
|---|---|---|---|
| 4,926,947 A | | 5/1990 | Cozine et al. |
| 6,213,673 B1 * | | 4/2001 | Jungwirth ............... B25F 5/006 403/120 |
| 6,267,532 B1 | | 7/2001 | Persson |
| 6,540,031 B1 | | 4/2003 | Sasaoka |
| 6,551,022 B1 * | | 4/2003 | Stayner .................. E02D 3/074 404/133.05 |
| 7,070,005 B2 | | 7/2006 | Maas et al. |
| 7,478,689 B1 * | | 1/2009 | Sugden .................. A01D 34/67 180/19.3 |
| 7,878,490 B2 * | | 2/2011 | Hartmann ............ A01D 34/824 188/378 |
| 8,491,218 B2 * | | 7/2013 | Halvorson .......... E01C 23/0933 299/39.3 |
| 2008/0289842 A1 | | 11/2008 | Chapple et al. |

FOREIGN PATENT DOCUMENTS

| | | |
|---|---|---|
| DE | 9319973 U1 | 3/1994 |
| EP | 262425 B1 | 6/1990 |
| FR | 2928331 B3 | 3/2010 |
| JP | 7236303 A | 9/1995 |
| JP | 2006191896 A | 7/2006 |
| WO | 2008056142 A2 | 5/2008 |

OTHER PUBLICATIONS

International Preliminary Report on Patentability in the International Application No. PCT/US2013/031581 dated Sep. 15, 2015.

* cited by examiner

DUAL FUNCTION VIBRATION ISOLATION AND HANDLE SWIVEL

TECHNICAL FIELD

Example embodiments generally relate to outdoor power equipment and, more particularly, relate to walk behind devices having a dual function handle assembly.

BACKGROUND

Grounds care/yard maintenance and other outdoor tasks associated with grooming and maintaining property are commonly performed using various tools and/or machines that are configured for the performance of corresponding specific tasks. Certain tasks, like snow removal, are typically performed by snow removal equipment such as snow blowers or snow throwers that may be mounted on riding or walk behind devices. Other tasks, like lawn mowing may be performed by riding or walk behind lawn mowers. Still other tasks, such as tilling, trimming and/or the like may also be employed by either riding or walk behind devices. Moreover, in some cases, such tasks may be performed using hand held power equipment.

One common type of tiller, or cultivator, employs some form of rotating assembly that is configured to stir, pulverize or otherwise break up the ground that is encountered thereby in order to loosen the soil, aerate the soil and alleviate soil compaction. Loosened soil may be more easily augmented with fertilizer and may also be more easily planted. Tilling might also convert a patch of soil that is currently covered with undesirable plants into a seed ready patch that can be prepared for conversion into a more useful agricultural purpose.

It is often desirable to control the depth to which the ground is tilled, stirred or pulverized. Thus, the rotating assembly may be configured to be rotated while encountering the soil down to a predefined depth. The rotating assembly may include teeth or disks that are turned through their interaction with the soil. When teeth are employed, they may be referred to as tines.

The rotation of the tines through the soil tends to break up the soil and also uproot any rooted plants that are encountered. For smaller plants, the uprooting action may simply kill the plant and discard the uprooted plant as the rotating assembly continues to turn in a continuous fashion. However, for larger plants that may have more developed or larger root systems, it is possible for the rotating assembly to encounter some more difficulty while attempting to cut through the root system. Similarly, if the rotating assembly encounters rocks or patches of compacted soil, the impact of striking such objects may be fed back to the operator through the handle. Accordingly, vibration isolation may be desired by an operator of certain walk behind devices like tillers. However, it should be appreciated that such vibration isolation may also be desired on other devices, and it may be desirable that improvements to vibration reduction be provided without necessarily reducing other aspects of performance.

BRIEF SUMMARY OF SOME EXAMPLES

Some example embodiments may therefore provide a dual function handle assembly that can provide multiple functional advantages within a single assembly. In this regard, for example, some embodiments may provide vibration isolation and a swivel function within a single assembly.

In one example embodiment, a walk behind power equipment device is provided. The device may include a frame or housing, an engine supported at least in part by the frame or housing, a mobility assembly operably coupled to the frame or housing and to the engine to provide mobility of the walk behind power equipment device responsive to operation of the engine, a working assembly and a handle assembly. The working assembly may be operably coupled to the frame or housing and to the engine to facilitate performance of a working function of the walk behind power equipment device responsive to operation of the engine. The handle assembly may be operably coupled to the frame or housing via a handle coupler to provide steering inputs responsive to which the mobility assembly moves the walk behind power equipment device via a handle apparatus of the handle assembly. The handle coupler is configured to provide at least vibration isolation and handle apparatus orientation adjustment.

In another example embodiment, a handle coupler for providing at least vibration isolation and handle apparatus orientation for a walk behind power equipment device is provided. The device may include a frame or housing, an engine supported at least in part by the frame or housing, a mobility assembly operably coupled to the frame or housing and to the engine to provide mobility of the walk behind power equipment device responsive to operation of the engine, a working assembly operably coupled to the frame or housing and to the engine to provide to provide performance of a working function of the walk behind power equipment device responsive to operation of the engine, and a handle assembly operably coupled to the frame or housing via a handle coupler to provide steering inputs responsive to which the mobility assembly moves the walk behind power equipment device via a handle apparatus of the handle assembly. The handle coupler may include an orientation adjustment assembly to provide the handle apparatus orientation adjustment, and a vibration isolation assembly to provide the vibration isolation.

In another example embodiment, a method of providing dual function coupling between a handle assembly and a walk behind power equipment device is provided. The method may include providing a handle coupler between a handle assembly of the device and a frame or housing of the device. The method may further include enabling rotation of the handle assembly out of alignment with a longitudinal length of the device via rotation of a swivel base of an orientation adjustment assembly about a swivel pin coupled to the frame or housing of the device. The method may further include fixing the swivel base at a selected orientation based on operation of a clamping device of a vibration isolation assembly. The vibration isolation assembly and the orientation adjustment assembly may each form a portion of the handle coupler to provide at least vibration isolation and handle apparatus orientation adjustment, respectively.

Some example embodiments may improve the ability of operators to improve performance and operability of a tiller, cultivator or other walk behind device, without sacrificing comfort of the operator.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments may improve an operator's experience associated with operating a tiller, cultivator, and/or other walk behind outdoor power equipment devices. In this regard, some embodiments may generally improve the operator's ability to operate the device from a comfortable position by enabling the operator to swivel the handle to a desired angle relative to the direction of motion of the device. However, to further improve the operator's experience, the handle may also be vibration isolated. Moreover, some example embodiments may incorporate the handle swivel functionality and the vibration isolation into a single assembly. Accordingly, an operator may, for example, till soil with less vibration being fed back to the operator through the handle, while walking beside the ground that has been tilled instead of walking directly behind the tiller and compacting already tilled soil by stepping on the tilled soil.

Figure 1:
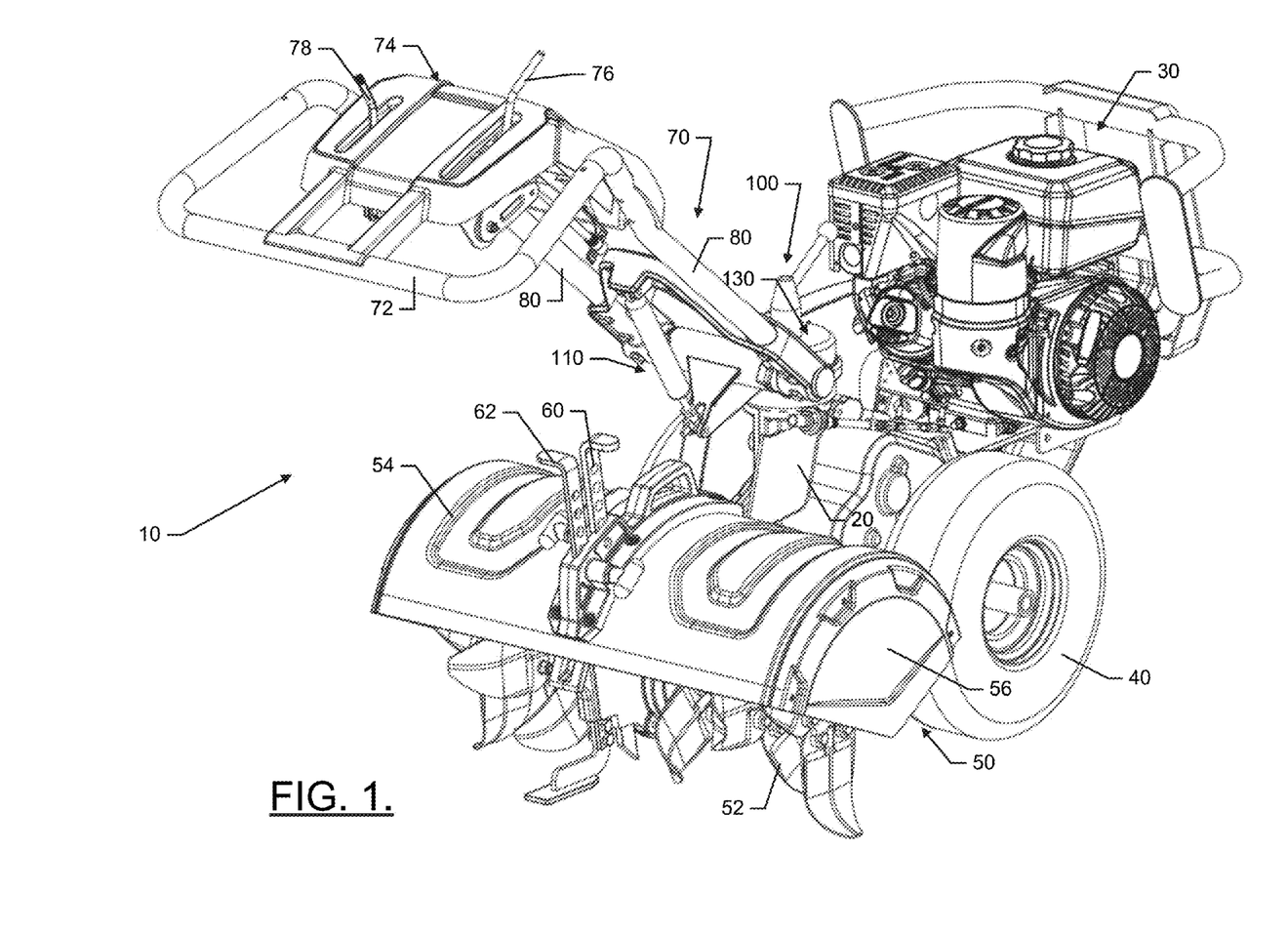
FIG. 1 illustrates a side perspective view of a walk behind tiller according to an example embodiment.
Figure 2:
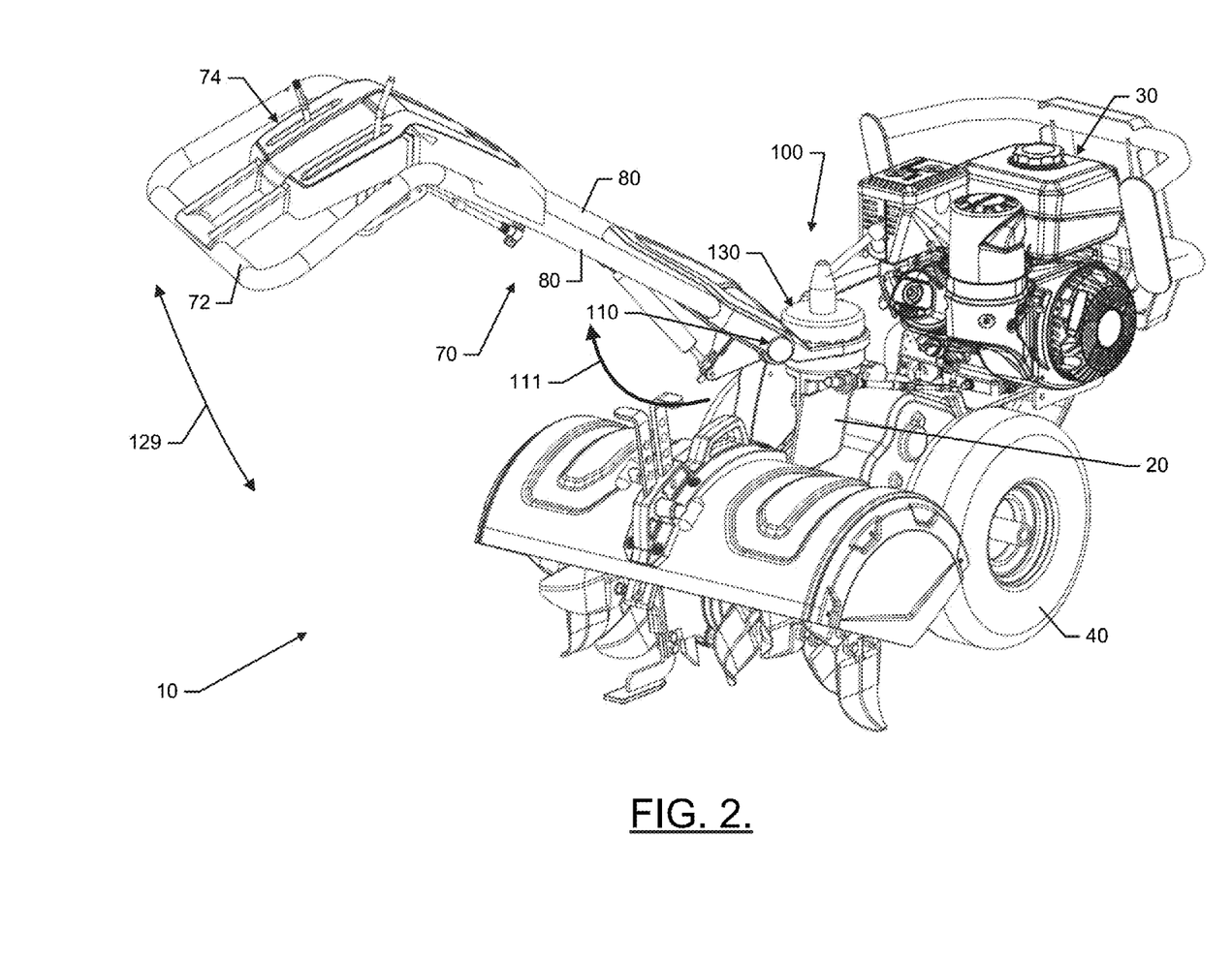
FIG. 2 illustrates a perspective view of the walk behind tiller of FIG. 1 with a handle assembly rotated out of alignment with the longitudinal length of the tiller according to an example embodiment.
Figure 3:
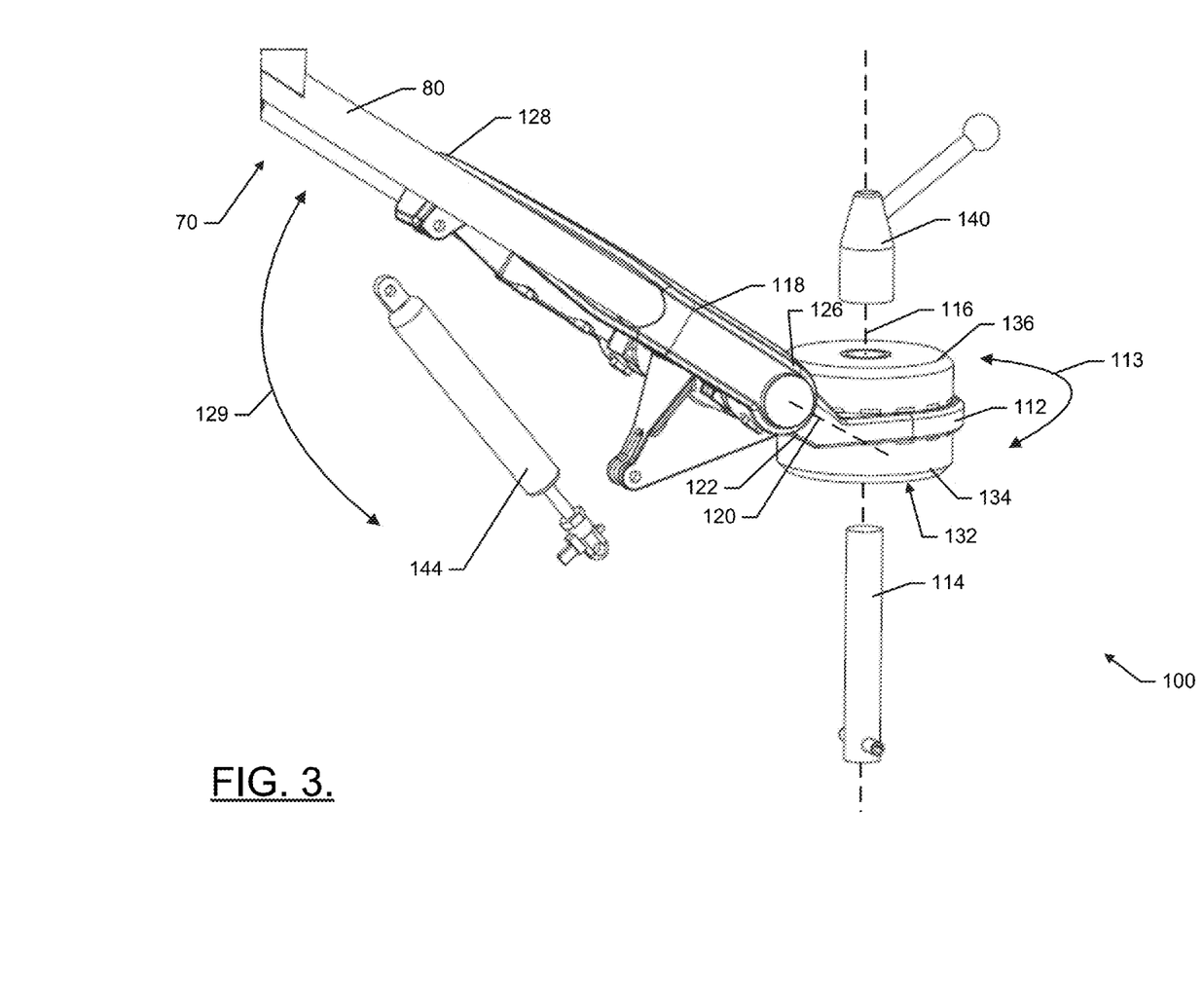
FIG. 3 illustrates a partially exploded perspective view of a dual function handle assembly according to an example embodiment.
Figure 4:
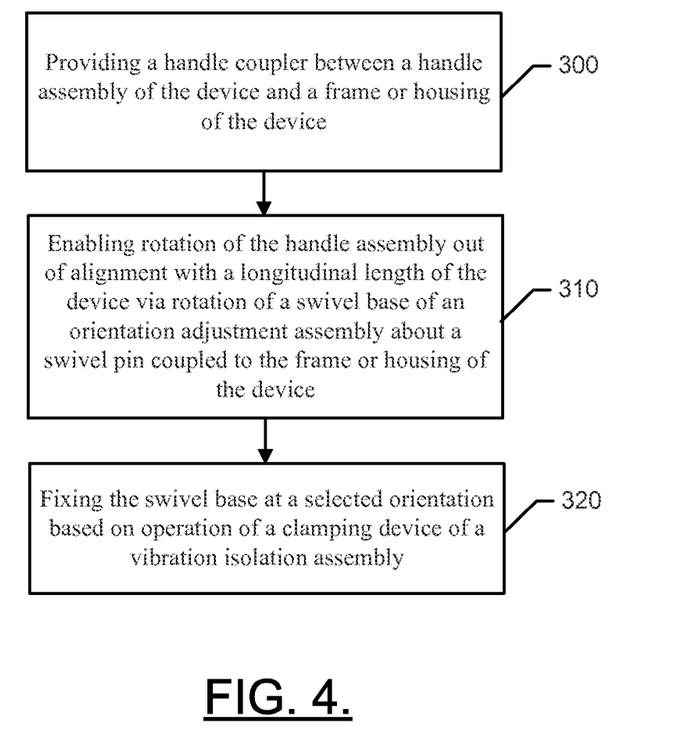
FIG. 4 illustrates a block diagram of a method of providing a tiller with a dual function handle assembly according to an example embodiment.

FIG. 1 illustrates a side view of walk behind power equipment according to an example embodiment in the form of a walk behind tiller 10. FIG. 2 illustrates a perspective view of the walk behind tiller 10 of FIG. 1 with a handle assembly rotated out of alignment with the longitudinal length of the tiller 10 according to an example embodiment. FIG. 3 illustrates a partially exploded perspective view of a dual function handle assembly of the tiller 10 according to an example embodiment. FIG. 4 illustrates a block diagram of a method of providing the tiller 10 with a dual function handle assembly according to an example embodiment.

An example embodiment will now be described in reference to FIGS. 1-4. Although the walk behind tiller 10 of FIGS. 1 and 2 is illustrated and will primarily be described herein, it should be appreciated that example embodiments may also be practiced in connection with any other types of tillers or cultivators as well with other walk behind power equipment including, for example, snow blowers or snow throwers. Thus, the descriptions provided herein relative to a walk behind tiller should be appreciated as being non-limiting examples.

The tiller 10 may include a chassis, frame 20 or housing to which various components of the tiller 10 may be attached. The frame 20 may support an engine 30, such as a gasoline powered engine. Operation of the engine 30 may be initiated by a recoil starter via pulling of a recoil starter handle by the operator. However, in other embodiments, tillers may alternatively be started via a key, switch or other similar device.

The tiller 10 may include wheels 40 or continuous tracks forming a mobility assembly on which a substantial portion of the weight of the tiller 10 may rest, when the tiller 10 is stationary. The wheels 40 or continuous tracks may also provide for mobility of the tiller 10. In some cases, the mobility assembly may be driven via power from the engine 30. However, in other cases, the mobility assembly may simply provide for mobility of the tiller 10 responsive to pushing by the operator.

The tiller 10 may also include a rotating assembly 50. In this example, the rotating assembly 50 includes a plurality of tines 52 that are configured to work, or dig up, the ground responsive to rotation of the set of tines 52 by operable coupling to the engine 30. The operable coupling of the set of tines 52 to the engine 30 may be selectively engaged and/or disengaged (e.g., via a clutch, a series of belts/pulleys, a friction wheel or other similar devices). In some embodiments, selective engagement to operably couple the set of tines 52 to the engine 30 may be facilitated via coupling of rotary motion provided by the engine 30 to a rotatable shaft on which the set of tines 52 is mounted. This coupling may be provided by a chain, belt or other such assembly. The rotating assembly 50 may be an example of a working assembly that may be powered by the engine 30. However, in some cases, the rotating assembly 50 may further be combined with the mobility assembly (i.e., no wheels may be provided).

On the tiller 10, the set of tines 52 may be housed within a shroud 54 including side panels 56 and a leveling shield (not shown). The shroud 54 may prevent or inhibit dirt and debris from being expelled from the vicinity of the set of tines 52 and toward the operator or other people or objects nearby, and may form a portion of the housing. The tiller 10 may also include a depth stake 60 and/or a drag stake 62 to facilitate operation of the tiller 10. Some embodiments may not employ the shroud 54, side panels 56 and/or the leveling shield.

In an example embodiment, a handle assembly 70 may extend rearward and upward from the frame 20 above the shroud 54 in order to enable the operator to engage the handle assembly 70 and operate the tiller 10 while walking behind the tiller 10 (e.g., at the operator station). The handle assembly 70 may include a handle apparatus 72, which may include a handlebar or handles (as shown in FIG. 1). In some embodiments, a control panel 74 may also be positioned proximate to the handle apparatus 72 to provide speed and/or other engine controls (e.g., via throttle control 76 and/or shift lever 78). Alternatively or additionally, the control panel 74 may host other functional controllers for operation of the tiller 10. However, the control panel 74 may be eliminated or serve other functions in other example embodiments. The handles or handlebar employed in connection with the handle apparatus 72 may, in some cases, include one or more levers, bails or other movable control members that can be grasped by the operator while the operator simultaneously grasps the handle apparatus 72. These levers, bails or other movable control members may be operated for engagement of the rotating assembly 50 or for other control functions that impact operation of the walk behind power equipment device.

In an example embodiment, the handle assembly 70 may include one or more elongate members 80 that may extend away from the frame 20 or main body portion of the tiller 10 to the handle apparatus 72. In some cases, when handles or handlebars are employed for the handle apparatus 72, the one or more elongate members 80 may be extensions of such handles or handlebars. However, the one or more elongate members 80 may alternatively be different components that are directly or indirectly coupled to the handle apparatus 72 and/or the control panel 74. In some embodiments, the one or more elongate members 80 may extend substantially between and facilitate provision of operable coupling between the frame 20 and the handle assembly 70.

As indicated above, some example embodiments may provide for at least dual functionality of the handle assembly 70 relative to, for example, providing vibration isolation in addition to providing a rotating or swivel capability. By enabling the handle assembly 70 to swivel, an operator can walk beside (or slightly behind and to the side of the track of) the tiller 10 during operation. Meanwhile, since the handle assembly 70 is vibration isolated, the operator may maintain positive control over the tiller 10 without experiencing excessive buffeting, bucking, vibration and/or the like. According to an example embodiment, dual functionality for vibration isolation and handle orientation adjustment of the handle assembly 70 may be provided by a handle coupler 100 of an example embodiment.

In an example embodiment, the handle coupler 100 may include an orientation adjustment assembly 110 and a vibration isolation assembly 130. The handle coupler 100 may be provided at an intersection of a portion of the chassis or frame 20 of the tiller 10 and the handle assembly 70. As such, the handle coupler 100 may provide operable coupling (directly or indirectly) between the frame 20 and the handle assembly 70. In some embodiments, the one or more elongate members 80 may extend from the handle coupler 100 to the handle apparatus 72 and/or control panel 74.

The orientation adjustment assembly 110 of some embodiments may include a swivel base 112 that may be configured to enable an orientation of the handle assembly 70 to be adjusted relative to a longitudinal length (or direction of travel) of the tiller 10. In this regard, the tiller 10 may be propelled or otherwise move in a direction that is substantially parallel to the longitudinal length of the tiller 10. However, the swivel base 112 may enable the handle assembly 70 to be rotated or swiveled out of alignment with the longitudinal length of the tiller 10. FIG. 2 illustrates an example in which the handle assembly 70 is rotated in the direction indicated by arrow 111 so that an operator standing on a left side of the tiller 10 may grasp the handle apparatus 72 to operate the tiller 10 while walking beside the tiller 10 instead of directly behind the tiller 10. In some cases, the orientation adjustment assembly 110 may be configured to enable the handle assembly 70 to be rotated as much as ninety degrees in either direction out of alignment with the longitudinal length of the tiller 10. Arrow 113 in FIG. 3 shows an arc of possible movement of the handle assembly 70 based on rotation of the swivel base 112.

In some embodiments, the swivel base 112 may be a substantially flat or plate shaped member that may be made of a rigid material such as metal, plastic or composite material. The swivel base 112 may include an orifice configured to receive a swivel pin 114. The orifice may receive the swivel pin 114 in a rotatable fashion so that the swivel base 112 is enabled to rotate around the swivel pin 114. As such, the swivel pin 114 may define an axis of rotation of the swivel base 112. The swivel pin 114 may be fixed to a portion of the frame 20 so that the swivel pin 114 provides a foundational structure from which the handle assembly 70 may be mounted. The swivel base 112 may be fixed at a selected orientation based on clamping of the swivel base 112 (e.g., using the dampening clamp 132 discussed in greater detail below) via a hand adjustable tightening mechanism.

In some cases, the swivel base 112 may therefore provide operable coupling between the handle assembly 70 and the frame 20 in such a manner as to permit the handle assembly 70 to be rotated about a first pivot axis 116 (e.g., the axis defined by the swivel pin 114) to a selected orientation. However, in other cases, the handle coupler 100 generally, and the swivel base 112 in particular, may be further configured to define another axis of rotation about which an orientation of the handle assembly 70 may be rotated. In this regard, in some embodiments, the swivel base 112 may be operably coupled to the one or more elongated members 80 via a handle height adjustment assembly 118 that may provide for pivoting of the handle assembly 70 about a second pivot axis 120 that may be defined to extend spaced apart from and substantially perpendicularly relative to the first pivot axis 116. In some cases, the first pivot axis 116 may be substantially perpendicular to the ground plane and the second pivot axis 120 may be substantially parallel to the ground plane.

In an example embodiment, the swivel base 112 may include a substantially flat portion that is disposed proximate to the orifice and the swivel pin 114, and a raised portion 122 may be provided such that a pin, rod and/or the like may be passed through the raised portion 122 along the second pivot axis 120 to engage corresponding receiving orifices disposed at distal ends 126 of the handle height adjustment assembly 118. Meanwhile, the one or more elongated members 80 may connect to or be partially housed within a portion of the handle height adjustment assembly 118 that is between an apex 128 of an A-frame structure that may form the handle height adjustment assembly 118 of an example embodiment and the distal ends 126.

As an alternative to the A-frame structure shown in FIG. 1, in some cases, only a single elongated member may be provided and the raised portion 122 may include one or more gaps provided at an interior portion (along the second pivot axis 120) thereof to receive a corresponding one or more receiving orifices therein so that the pin, rod and/or the like that passes therethrough may form the axis of rotation for the handle height adjustment assembly. In some cases, one end of the pin, rod, etc., may include an adjustable tightening mechanism to enable the operator to lock the height adjustment assembly 118 at a desired elevation. Thus, for example, the distal ends 126 of the A-frame structure may be rotated about the second pivot axis 120 and locked in position at the selected elevation. However, it should be appreciated that in still other alternatives, rather than providing an A-frame structure, an H-frame structure may be provided where a cross-bar passes between elongated members, or still other suitable structures may be provided.

In any case, the handle height adjustment assembly 118 may rotate about the second pivot axis 120 in the arc shown by arrow 129. By rotating the handle height adjustment assembly 118 upward about the second pivot axis 120, the handle apparatus 72 may be provided at a higher elevation. Meanwhile, by rotating the handle height adjustment assembly 118 downward about the second pivot axis 120, the handle apparatus 72 may be provided at a lower elevation.

The vibration isolation assembly 130 may provide a vibration dampening function for the handle apparatus 72. In an example embodiment, the orientation adjustment assembly 110 may be operably coupled to the frame 20 at least in part via the vibration isolation assembly 130. Thus, for example, although the handle coupler 80 may provide operable coupling between the frame 20 and the handle assembly 70, the vibration isolation assembly 130 may further provide operably coupling within the handle coupler 80, to operably couple the orientation adjustment assembly 110 to the frame 20. In an example embodiment, the orientation adjustment assembly 110 may be supported by the vibration isolation assembly 130.

In this regard, as shown in FIG. 1, the vibration isolation assembly 130 may include a dampening clamp 132 configured to engage the swivel base 112 in a manner that enables shock and/or vibration that is experienced at the frame or housing of the tiller 10 to be dampened prior to communication of such shock and/or vibration up to the handle apparatus 72. The dampening clamp 132 may include a first cushion mount 134 that may be disposed proximate to a main body portion of the tiller 10, and a second cushion mount 136 that may be disposed on an opposite side of the swivel base 112 relative to the first cushion mount 134. The first and second cushion mounts 134 and 136 may each include an orifice to receive the swivel pin 114. The swivel pin 114 may therefore pass through the first cushion mount 134, the swivel base 112 and then the second cushion mount 136. In some cases, the swivel pin 114 may be threaded at least at a distal end thereof, and a threaded nut 140 may be configured to be tightened onto the second cushion mount 136 to adjust a degree of tightness with which the dampening clamp 132 provides a clamping force onto the swivel base 112. In this regard, for example, as the threaded nut 140 is tightened, the second cushion mount 136 may be forced toward the first cushion mount 134 to pin the swivel base 112 more tightly therebetween. The threaded nut 140 may be hand operable, and therefore may include a handle.

In an example embodiment, both the first and second cushion mounts 134 and 136 may be made of rubber or some other resilient material that may be enabled to absorb shock and/or vibration that is felt by the frame 20 so that the shock or vibration is not coupled (or is coupled inefficiently) to the handle assembly 70. In some embodiments, as shown in FIG. 2, the vibration isolation assembly 130 may further (or alternatively) include a dampening cylinder 144. In some cases, the dampening cylinder 144 may be embodied as a gas or air cylinder. Furthermore, in some embodiments, the dampening cylinder 144 may be provided with a remotely operable two way valve. The remotely operable two way valve may be operated such that the valve may be opened to enable pressurized gas or air within the air cylinder to be moved in either direction through the two way valve to permit movement of a plunger disposed to separate two compartments of the air cylinder in either direction (e.g., toward either of the separate compartments). When the valve is closed, air may be locked in each separate compartment of the air cylinder to fix a position of at least one shaft extending out of an end of the air cylinder from the plunger. The shaft extending out of one end (or both ends) of the air cylinder may therefore elongate or contract the length of the dampening cylinder 144 dependent upon a position of the internal plunger as described above in order to adjust a height of the handle assembly 70 along its entire range of motion. In this regard, for example, the dampening cylinder 144 may extend between respective brackets disposed at the raised portion 122 of the swivel base 112 and the apex 128 of the A-frame structure that forms the handle height adjustment assembly 118.

In an example embodiment, the air pressure locked in each compartment of the dampening cylinder 144 may be allowed to momentarily increase or decrease to dampen shocks/vibrations. However, responsive to a shock increasing pressure in one compartment, the increasing pressure may exert a force in an opposing direction to tend to return the dampening cylinder 144 to its prior steady state position. Accordingly, the dampening cylinder 144 may decouple (or at least inefficiently couple) the handle assembly 70 from the frame 20 relative to shock and/or vibration.

The number and location of the positions at which the plunger may be fixed within the air cylinder (e.g., by closure of the two way valve) may not be predefined. As such, the plunger may be disposed at any of an infinite number of potential locations within the confines of the air cylinder. This means that the handle height adjustment assembly 118 is not limited to being fixable at discrete intervals since the air cylinder does not have any discrete fixing points therein. Having a capability for non-discrete fixing locations, or infinite number of fixing points along the range of motion of the handle assembly 70, may provide an advantage to operators that might otherwise find that one fixed position is too high, while the next available fixed position is too low. Furthermore, the ability to remotely actuate the plunger position may further provide an operator with the ability to adjust the height of the handle apparatus 72 without leaving the operator station and without the use of tools. In an example embodiment, a remote actuator for positioning the plunger may be provided as a hand operated lever disposed at the handle apparatus 72, or via any other suitable mechanism (e.g., a pedal, lever or switch).

FIG. 4 illustrates a block diagram of a method of providing dual function coupling between a handle assembly and a walk behind power equipment device is provided. The method may include providing a handle coupler between a handle assembly of the device and a frame or housing of the device at operation 300. The method may further include enabling rotation of the handle assembly out of alignment with a longitudinal length of the device via rotation of a swivel base of an orientation adjustment assembly about a swivel pin coupled to the frame or housing of the device at operation 310. The method may further include fixing the swivel base at a selected orientation based on operation of a clamping device of a vibration isolation assembly at operation 320. The vibration isolation assembly and the orientation adjustment assembly may each form a portion of the handle coupler to provide at least vibration isolation and handle apparatus orientation adjustment, respectively.

Accordingly, in an example embodiment, a walk behind power equipment device may b e provided. The device may include a frame or housing, an engine supported at least in part by the frame or housing, a mobility assembly operably coupled to the frame or housing and to the engine to provide mobility of the walk behind power equipment device responsive to operation of the engine, a working assembly and a handle assembly. The working assembly may be operably coupled to the frame or housing and to the engine to facilitate performance of a working function of the walk behind power equipment device responsive to operation of the engine. The handle assembly may be operably coupled to the frame or housing via a handle coupler to provide steering inputs responsive to which the mobility assembly moves the walk behind power equipment device via a handle apparatus of the handle assembly. The handle coupler is configured to provide at least vibration isolation and handle apparatus orientation adjustment.

In an example embodiment, the device may include additional, optional features, and/or the features described above may be modified or augmented. Some examples of modifications, optional features and augmentations are described below. In this regard, for example, in some cases, (1) the handle coupler includes, at an intersection of the handle assembly and a portion of the frame or housing, an orientation adjustment assembly to provide the handle apparatus orientation adjustment and a vibration isolation assembly to provide the vibration isolation. In an example embodiment, (2) the orientation adjustment assembly includes a swivel pin attached to the frame or housing, and the swivel pin forms a first axis of rotation about which the orientation adjustment assembly is enabled to be rotated out of alignment with a longitudinal length of the walk behind power equipment device. In some cases, (3) the orientation adjustment assembly includes a swivel base comprising a substantially plate-like structure having an orifice for receiving the swivel pin, and the swivel base further defines a second axis of rotation about which a handle height adjustment assembly is rotatable to adjust a height of the handle apparatus. In an example embodiment, (4) the first axis of rotation is spaced apart from and substantially perpendicular to the second axis of rotation. In some embodiments, (5) the vibration isolation assembly may include a dampening clamp configured to engage the orientation adjustment assembly. In some cases, (6) the dampening clamp includes a first cushion mount disposed proximate to the housing or frame, and a second cushion mount disposed on an opposite side of a swivel base of the orientation adjustment assembly relative to the first cushion mount. In an example embodiment, (7) the first and second cushion mounts each include an orifice aligned with an orifice of the swivel base to receive a swivel pin, and the swivel pin passes through the first cushion mount, the swivel base and then the second cushion mount. The swivel pin may receive a clamping device (e.g., a threaded nut or other device capable of providing a tensioned closure) configured to be tightened onto the second cushion mount to adjust a degree of tightness with which the dampening clamp provides a clamping force onto the swivel base.

In some embodiments, any or all of (1) to (7) may be employed and the vibration isolation assembly includes a gas or air cylinder operably coupled to the orientation adjustment assembly. In an example embodiment, any or all of (1) to (7) may be employed and the vibration isolation assembly includes a gas or air cylinder operably coupled to the orientation adjustment assembly and fixable at a plurality of lengths based on a position of a two-way valve in the gas or air cylinder to adjust an elevation of the handle apparatus and dampen shock or vibration transmission from the frame or housing to the handle apparatus. In some cases, any or all of (1) to (7) may be employed and the working assembly is a blade, auger or tiller tines, and wherein the walk behind power equipment device is a mower, snow blower or tiller.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A walk behind power equipment device comprising:
a frame or housing;
an engine supported at least in part by the frame or housing;
a mobility assembly operably coupled to the frame or housing and to the engine to provide mobility of the walk behind power equipment device responsive to operation of the engine;
a working assembly operably coupled to the frame or housing and to the engine to facilitate performance of a working function of the walk behind power equipment device responsive to operation of the engine; and
a handle assembly operably coupled to the frame or housing via a handle coupler to provide steering inputs responsive to which the mobility assembly moves the walk behind power equipment device via a handle apparatus of the handle assembly,
wherein the handle coupler is configured to provide at least vibration isolation and handle apparatus orientation adjustment,
wherein the handle coupler includes, at an intersection of the handle assembly and a portion of the frame or housing, an orientation adjustment assembly to provide the handle apparatus orientation adjustment and a vibration isolation assembly to provide the vibration isolation,
wherein the vibration isolation assembly comprises a dampening clamp configured to engage the orientation adjustment assembly, and
wherein the dampening clamp includes a first cushion mount disposed proximate to the housing or frame, and a second cushion mount disposed on an opposite side of a swivel base of the orientation adjustment assembly relative to the first cushion mount.

2. The walk behind power equipment device of claim 1, wherein the orientation adjustment assembly includes a swivel pin attached to the frame or housing, and wherein the swivel pin forms a first axis of rotation about which the orientation adjustment assembly is enabled to be rotated out of alignment with a longitudinal length of the walk behind power equipment device.

3. The walk behind power equipment device of claim 2, wherein the swivel base comprises a substantially plate-like structure having an orifice for receiving the swivel pin, and wherein the swivel base further defines a second axis of rotation about which a handle height adjustment assembly is rotatable to adjust a height of the handle apparatus.

4. The walk behind power equipment device of claim 3, wherein the first axis of rotation is spaced apart from and substantially perpendicular to the second axis of rotation.

5. The walk behind power equipment device of claim 1, wherein the first and second cushion mounts each include an orifice aligned with an orifice of the swivel base to receive a swivel pin, the swivel pin passing through the first cushion mount, the swivel base and then the second cushion mount, the swivel pin receiving a clamping device configured to be tightened onto the second cushion mount to adjust a degree of tightness with which the dampening clamp provides a clamping force onto the swivel base.

6. The walk behind power equipment device of claim 1, wherein the vibration isolation assembly includes a gas or air cylinder operably coupled to the orientation adjustment assembly.

7. The walk behind power equipment device of claim 1, wherein the vibration isolation assembly includes a gas or air cylinder operably coupled to the orientation adjustment assembly and fixable at a plurality of lengths based on a position of a two-way valve in the gas or air cylinder to adjust an elevation of the handle apparatus and dampen shock or vibration transmission from the frame or housing to the handle apparatus.

8. The walk behind power equipment device of claim 1, wherein the working assembly is a blade, auger or tiller tines, and wherein the walk behind power equipment device is a mower, snow blower or tiller.

\* \* \* \* \*